United States Patent
Murphy et al.

(10) Patent No.: US 9,544,732 B2
(45) Date of Patent: Jan. 10, 2017

(54) MOBILE COMMUNICATION SYSTEM

(71) Applicant: Viavi Solutions UK Limited, Berkshire (GB)

(72) Inventors: Christopher Murphy, Bath (GB); Michael Joseph Flanagan, Chester, NJ (US); Peter Kenington, Chepstow (GB)

(73) Assignee: Viavi Solutions UK Limited, Berkshire (GB)

( * ) Notice: Subject to any disclaimer, the term of this patent is extended or adjusted under 35 U.S.C. 154(b) by 431 days.

(21) Appl. No.: 13/719,189

(22) Filed: Dec. 18, 2012

(65) Prior Publication Data

US 2014/0171104 A1    Jun. 19, 2014

(51) Int. Cl.
*H04W 4/00* (2009.01)
*H04W 4/02* (2009.01)
*H04W 64/00* (2009.01)

(52) U.S. Cl.
CPC ............. *H04W 4/025* (2013.01); *H04W 64/00* (2013.01)

(58) Field of Classification Search
CPC ......... H04L 12/26; H04W 4/00; H04W 40/00; H04W 8/06; H04B 17/00
See application file for complete search history.

(56) References Cited

U.S. PATENT DOCUMENTS

| 8,351,938 | B1 * | 1/2013 | Shetty | H04W 48/18 370/235 |
| 2005/0130667 | A1 * | 6/2005 | Boiero | H04W 64/00 455/456.1 |

(Continued)

FOREIGN PATENT DOCUMENTS

| EP | 2296398 | 3/2011 | ............ H04W 24/08 |
| EP | 2579640 | 4/2013 | ............ H04W 24/08 |
| WO | 2010/083943 A1 | 7/2010 | |

OTHER PUBLICATIONS

"3$^{rd}$ Generation Partnership Project; Technical Specification Group Radio Access Network; Universal Terrestrial Radio Access (UTRA) and Evolved Universal Terrestrial Radio Access (E-UTRA); Radio Measurement collection for Minimization of Drive Tests (MDT); Overall description; Stage 2 (Release 11)", 3GPP DRAFT; DRAFT_37320-B10, 3rd Generation Partnership Project (3GPP), Mobile Competence Centre; 650, Route Dea Lucioles; F-06921 Sophia-Antipolis Cedex; France Sep. 18, 2012.

(Continued)

*Primary Examiner* — Myron K Wyche
(74) *Attorney, Agent, or Firm* — Harrity & Harrity, LLP

(57) ABSTRACT

A cellular wireless communications system and method of generating reference signatures for use in geolocation are provided. The cellular wireless communications system identifies a sub-area within the coverage area of a cellular wireless communications system, the sub-area having a density of radio frequency measurements that is below a threshold value. A user of a subscriber mobile communication unit is influenced to enter the sub-area, the subscriber mobile communication unit being a subscriber to the cellular wireless communications system. The cellular wireless communications system obtains radio frequency measurements from the subscriber mobile communication unit in the sub-area, and generates reference signatures and/or location estimates from the radio frequency measurements. The reference signatures may be used to geolocate connections made by other mobile communication units within the sub-areas.

21 Claims, 6 Drawing Sheets

(56) References Cited

U.S. PATENT DOCUMENTS

| | | | |
|---|---|---|---|
| 2005/0278228 A1* | 12/2005 | Schultz | G06Q 30/0609 705/26.35 |
| 2006/0126556 A1* | 6/2006 | Jiang | H04L 12/18 370/328 |
| 2009/0156208 A1* | 6/2009 | Vesterinen | H04W 48/08 455/435.1 |
| 2009/0325600 A1 | 12/2009 | Lee | 455/456.1 |
| 2010/0127887 A1 | 5/2010 | Ledlie et al. | 340/825.49 |
| 2011/0222475 A1* | 9/2011 | Hole | H04W 74/004 370/328 |
| 2012/0289221 A1* | 11/2012 | Huber | G06Q 20/1235 455/422.1 |
| 2013/0143588 A1 | 6/2013 | Flanagan et al. | |
| 2013/0210449 A1 | 8/2013 | Flanagan | |
| 2014/0140293 A1* | 5/2014 | Sharma | H04L 5/001 370/329 |
| 2014/0171102 A1 | 6/2014 | Murphy et al. | |
| 2014/0171103 A1 | 6/2014 | Murphy et al. | |

OTHER PUBLICATIONS

EP Search Report for EP Appln No. 13197820 dated Jun. 27, 2014.
$3^{rd}$ Generation Partnership Project (3GPP), "$3^{rd}$ Generation Partnership Project; Technical Specification Group Services and System Aspects; Telecommunication management; Subscriber and equipment trace; Trace control and configuration management (Release 11)," 3GPP TS 32.422, V11.4.0, Jun. 2012, 122 pages.
M. Khan, "Mobile Cellular Location Positioning: An Approach Combining Radio Signal Strength Propagation and Trilateration," Masters Thesis in Electrical and Electronic Engineering Sciences at the University of Johannesburg, Nov. 2009, 161 pages.

\* cited by examiner

MOBILE COMMUNICATION SYSTEM

CROSS-REFERENCE TO RELATED APPLICATIONS

This application is related to copending U.S. patent application Ser. No. 13/719,179, entitled METHOD AND SYSTEM FOR MOBILE REFERENCE SIGNATURE GENERATION, and copending U.S. patent application Ser. No. 13/719,166, entitled MOBILE GEOLOCATION, both of which were filed on Dec. 18, 2012 and incorporated herein by reference in their entireties.

FIELD OF THE INVENTION

The field of the invention relates to a system and method for generating reference signatures in a mobile communication system.

BACKGROUND OF THE INVENTION

Wireless communication systems, such as the 3rd Generation (3G) of mobile telephone standards and technology, are well known. An example of such 3G standards and technology is the Universal Mobile Telecommunications System (UMTS™), developed by the 3rd Generation Partnership Project (3GPP™).

The $3^{rd}$ and $4^{th}$ generations of wireless communications, and in particular systems such as LTE, have generally been developed to support macro-cell mobile phone communications. Here the 'phone' may be a smart phone, or another mobile or portable communication unit that is linked wirelessly to a network through which calls are connected. Henceforth all these devices will be referred to as mobile communication units. 'Calls' may be data, video, or voice calls, or a combination of these. An increasing proportion of communications involve data rather than voice. Communications are technically referred to as being a 'connection', rather than a 'call'.

Macro cells utilize high power base stations to communicate with wireless communication units within a relatively large geographical coverage area. The coverage area may be several square kilometers, or larger if it is not in a built-up area.

Typically, mobile communication units communicate with each other and other telephone systems through a network. In a 3G system, this is the 'Core Network' of the 3G wireless communication system, and the communication is via a Radio Network Subsystem. A wireless communication system typically comprises a plurality of Radio Network Subsystems. Each Radio Network Subsystem comprises one or more cells, to which mobile communication units may attach, and thereby connect to the network. A base station may serve a cell with multiple antennas, each of which serves one sector of the cell. Often a cellular wireless communication system is described as comprising two parts: the network; and the mobile communication units.

FIG. 1 provides a perspective view of one prior art wireless communication system 100. The system of FIG. 1 comprises a network of base stations, comprising BS1 with reference 110, BS2 with reference 120, BS3 with reference 130, BS4 with reference 140 and BS5 with reference 150. Only one mobile communication unit 105 is shown. In a real network, there may be anywhere from thousands to millions of mobile communication units.

A base station such as 110 communicates with mobile communication unit 105. Base station 110 allows mobile communication unit 105 to place calls through the network, and receive calls routed through the network to base station 110.

Base station 140 has been shown as having a coverage area 142. If base station 140 had an omnidirectional antenna, and the terrain were flat, then coverage area 142 might be circular. However, both the shape and extent of the coverage areas of a typical base station depend on many variables, and may change with time.

Controller 160 manages calls within the wireless communication system 100. Controller 160 would be linked to all the base stations BS1-BS5, but the links are not shown in order to keep FIG. 1 simple to interpret. Controller 160 may process and store call information from the base stations, plus many other base stations not shown in FIG. 1. In a UMTS network, controller 160 may be linked to the base stations via one or more Radio Network Subsystems.

There may be significant advantage in knowing: (i) information about coverage and quality of service in each part of the network; and (ii) where a mobile communication unit 105 is located in wireless communication system 100. Prior art wireless communication systems have provided a variety of solutions to the problem of 'geolocating' mobile communication unit 105. One known solution involves providing specific equipment within the mobile communication unit that can measure location, such as a GPS unit. However, many users switch off the GPS function on their mobile communication units. Partly as a consequence, reported GPS details are highly infrequent. As little as one call in ten-thousand connections might report a GPS coordinate.

One prior art solution indicates that absolute power transmission levels can be used to geo-locate the mobile station. See for example "Mobile Cellular Location Positioning: An Approach Combining Radio Signal Strength Propagation and Trilateration", M. F. Khan, Masters Thesis, University of Johannesburg, November 2009 which is herein incorporated by reference in its entirety. Co-pending U.S. patent application Ser. No. 13/311,132, with applicant reference OPT004P326, which is also incorporated by reference in its entirety, indicates that differential power levels can be used to geo-locate a mobile communication unit. Patent application WO2010/083943A shows a further technique, which uses signal strength and timing data derived from the mobile communication unit itself, along with network configuration data provided by the network operator, to locate the mobile communication unit.

Co-pending U.S. patent application Ser. No. 13/369,591, with applicant reference OPT004P330, and is hereby incorporated by reference in its entirety, indicates that a database of 'known' signatures can be used to aid in locating a mobile communication unit operating in a mobile communications system. Each known signature comprises a location measurement or estimate, together with radio frequency and other measurements that were obtained by a mobile communication unit at that location at a particular time. Examples of the 'other measurements' that may be obtained by a mobile communication unit are: control information; a set of cells observable by the first mobile communication unit; and received power level information, for signals received from the observable cells. The use of this database of known signatures enables position estimates to be derived, at least for any mobile communication devices that report similar values of the radio frequency and other measurements to those of a known signature.

The invention of U.S. patent application Ser. No. 13/369,591 only allows the estimation of the position of a mobile communication device if there is a match between a known signature in the database and the values of the radio frequency and other measurements reported by that mobile communication device. This approach therefore relies on the database having very many known signatures. For a cellular two-way radio system, the database may require hundreds of thousands or millions of known signatures. Obtaining these known signatures may be difficult. One approach is to collect signatures with location information by drive-testing and/or indoor-walk-testing. Such testing relies on moving a test mobile communications device through a network, in order to collect accurate position measurements from the mobile communication device and at the same time measure, for those positions, the values of various radio frequency and other measurements.

Drive-testing and indoor-walk-testing have the disadvantages that:

(i) Drive-test and walk-test signatures may not be easily obtained in the areas most frequented by actual users. This is because some areas are not accessible for either drive- or walk-testing, such as private company premises.

(ii) Signatures can be expensive to obtain over extensive areas, since they require intensive use of personnel and, where relevant, vehicles.

Signatures obtained from drive- or walk-testing can be augmented by selecting data from the Operation Support System (OSS) of the mobile communications system. The OSS holds measurements made by many or all of the subscriber mobile communication units that operate in a mobile communications system. Some or all of the calls made during drive- or walk-testing will result in a record being created in the OSS. In some systems, the record of the call from the test mobile communications device and the corresponding record from the OSS both contain identification information for the test mobile communications device. If this is the case, then the common identification information can be used to retrieve the correct individual record from the OSS, by matching its identification information with the identification information for the test mobile communications device used in the drive or walk testing. Then the records can be combined. In particular, the record retrieved from the OSS may contain measurements made by the mobile communications system that can be added to the record of the same call that was made by the test mobile communications device itself as part of drive or walk testing.

Phone applications, usually referred to as 'apps', are becoming common on mobile communication units. Various phone apps facilitate an enormous range of tasks, and usually involve users of mobile communication units providing some data during the course of using the phone apps. However, that information tends not to be captured or be available for use by the wireless communications system, but rather for use by social media websites and other commercial service providers.

Known cellular wireless communication systems tend to lack data about the performance of the network at specific locations. These may be geographical areas in which network equipment has been newly installed, for example. Another example might be a network that relied on drive- or walk-testing for data about the performance of the network, and such data was unobtainable where vehicles and walk testers are not permitted access. Hence, there is a need for an improved provision of coverage and capacity data for a mobile communications system such as an LTE, GSM or UMTS network

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
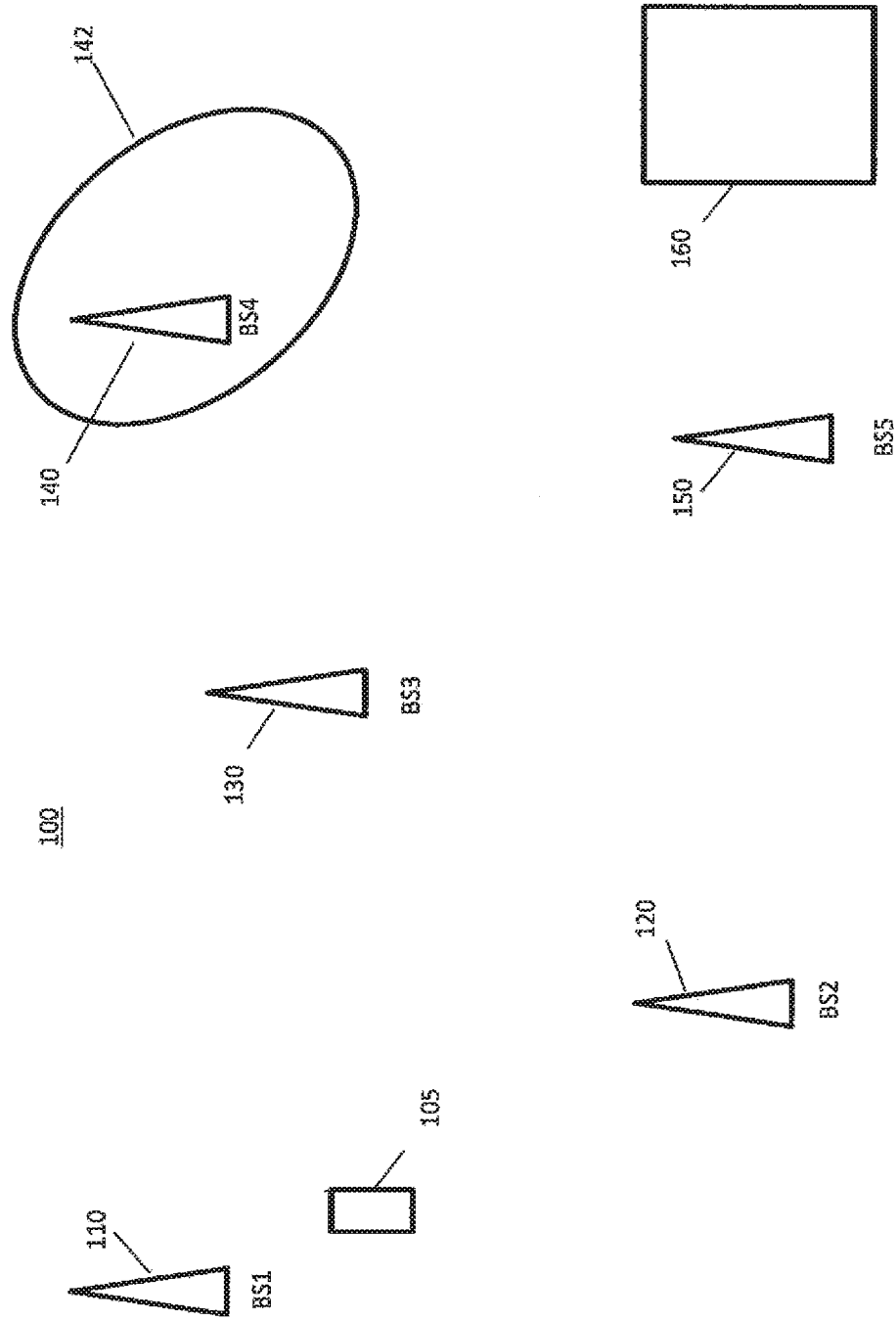
FIG. 1 is a schematic diagram, illustrating a prior art cellular wireless communication system.

Skilled artisans will appreciate that elements in the figures are illustrated for simplicity and clarity and have not necessarily been drawn to scale. For example, the dimensions of some of the elements in the figures may be exaggerated relative to other elements to help to improve under-standing of embodiments of the present invention.

DESCRIPTION OF THE ILLUSTRATIVE EMBODIMENTS

Before describing in detail embodiments that are in accordance with the present invention, it should be observed that the embodiments reside primarily in combinations of method steps and apparatus components related to a computer camera lighting system and method. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "compromising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints preclude the existence of additional identical elements in the process, method, article or apparatus that comprises the element.

A cellular wireless communications system and a method of generating reference signatures for use in geolocation in a cellular wireless communications system are provided. The cellular wireless communication system may, for example, operate in accordance with the GSM, UMTS or LTE standards.

A method of generating reference signatures for use in geolocation in a cellular wireless communications system is provided. Subscriber mobile communication units make radio frequency measurements within the cellular wireless communications system. The cellular wireless communications system identifies a sub-area within the coverage area of the cellular wireless communications system, the sub-area having a density of radio frequency measurements that is below a threshold value. The cellular wireless communications system then influences one or more users of subscriber mobile communication units to enter the sub-area, the subscriber mobile communication units being subscribed to the cellular wireless communications system. Once the subscriber mobile communication units are in the sub-area, the cellular wireless communications system obtains radio frequency measurements from the units that the units have obtained whilst in the sub-area. The cellular wireless communications system generates reference signatures from the radio frequency measurements.

In accordance with this method, the subscriber mobile communication unit may provide radio frequency measurements as soon as it enters the sub-area. This may be achieved by a network element in the infrastructure of the cellular wireless communications system providing details of an extent of the sub-area to the subscriber mobile communication unit. The subscriber mobile communication unit may then detect when it has entered into the sub-area, perform a location measurement responsive to detecting that it has entered the sub-area, and transmit the location measurement to the infrastructure element.

Alternatively, the subscriber mobile communication unit may be configured or designed to automatically and continuously collect radio frequency parameters and measurement data, at all times, whether inside or outside of the sub-area. In this case, all of this data may be stored and analysed by the cellular wireless communications system, with particular relevance or importance attached to the data obtained within the sub-area, due to the relative scarcity of such data to the cellular wireless communications system.

Various options exist to influence the users of subscriber mobile communication units to enter the sub-area. For example, a user may be influenced to enter the sub-area by notification of a reduced tariff for communications from the sub-area. An alternative form of reward may comprise a reduction to a bill and/or the granting of credit against future calls, in return for entering and/or remaining within the sub-area and thereby providing radio frequency measurements from the sub-area. A user may be influenced to enter the sub-area by means of a game, the game requiring attendance at at least one location within the sub-area. The incentive may increase, with increasing time spent in the sub-area, and/or with increasing amounts of radio frequency measurements provided in the sub-area.

Once in the sub-area, the subscriber mobile communication unit may provide coverage and quality of service information, and/or location measurements, that are otherwise hard or impossible to obtain by other means, from the sub-area.

Figure 2:
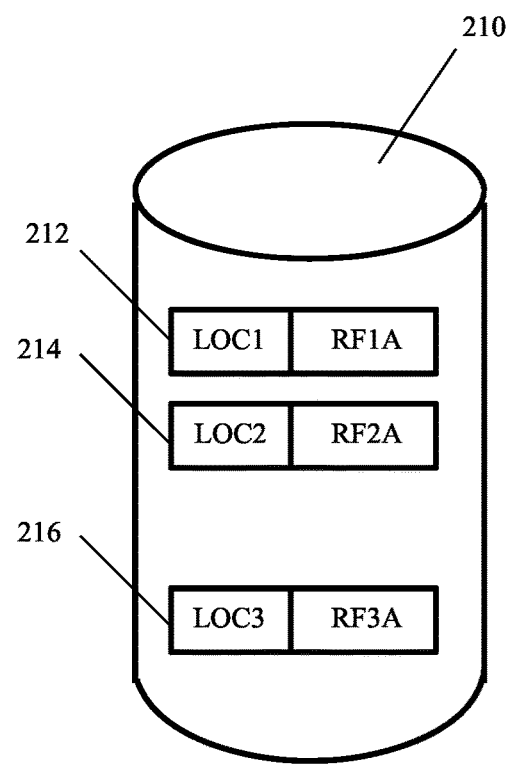
FIG. 2 is a schematic diagram, illustrating a database for a cellular wireless communication system.

FIG. 2 is a schematic diagram, illustrating a database 210 of reference signatures for a cellular wireless communication system. Database 210 may be obtained by known walk- or drive testing approaches. However, database 210 may alternatively be an 'anonymized call' database complied in accordance with the 'Minimization of Drive Test 3GPP' standard. The 3GPP Minimisation of Drive Test standard is explained in standards documents 3GPP TS 37.320 and TS 32.422.

Anonymized call databases have hitherto been only of limited use. Such databases are 'rich' in location information about where a mobile communication device was located when it made a call. However, they can be considered to be limited databases in the sense that they typically both:

(i) Lack user identity information; and
(ii) Provide only a relatively small amount of data, such as information only about received powers and serving cells.

Database 210 will typically have few records for some areas of the cellular wireless communication system. For example, geographical, social and security considerations may make obtaining measurements from those areas impossible by means of known approaches with drive- and walk-testers as the users. Examples of these situations arise when drive testing cannot be used, for example, in buildings and pedestrian precincts, or where the terrain is unsuitable even for all-terrain vehicles. Both walk- and drive-testers may be denied access to many areas, for example gated neighbourhoods, private company premises, schools and university campuses, large sections of airports. Although phone network operators' subscribers need to make calls from these areas, the networks themselves have found themselves, with known approaches, lacking in coverage, quality of service information and/or location measurements for those areas.

Each signature in database 210 may contain a location measurement, but typically does not contain information about the identity of the mobile communication unit that made the call. Each signature in database 210 typically only contains a more limited set of RF measurements than is available in the network operators' databases that hold all call records. Such databases may be part of the Operations System Support (OSS) of the network. Co-pending application Ser. No. 13/719,166, filed by Applicant on the same day as the present application and entitled 'Mobile Geolocation' explains how to create reference signatures by combining signatures from such an OSS database with a database such as database 210.

In the example shown in FIG. 2, there are three signatures in database 210. Signatures 212 and 216 have both been recorded for one mobile communication unit SU1, at two different locations. Signature 212 was recorded before signature 216. Both signatures 212 and 216 comprise a location estimate for mobile communication device SU1.

Signature 212 contains location estimate LOC1, and RF information RF1A. Signature 212 is a record of measurements of the same call by mobile communication unit SU1 as signature 216. SU1 recorded the measurements that make up signature 212 earlier in the call than the measurements that make up signature 216. Signature 216 contains location estimate LOC3, and RF information RF3A.

A signature 214 is also recorded in second database 210, but relates to a second mobile communication device SU2. Signature 214 was recorded after signature 212, but before signature 216. Signature 214 is included in this example only to show that database 210 contains other signatures, from other mobile communication units than mobile communication unit SU1. Signature 214 contains location estimate LOC2 and RF information RF2A.

Signatures 212, 214 and 216 in the database 210 may be recorded if, for example, mobile communication units SU1 and SU2 are selected to contribute anonymously to a limited RF database. The limited RF database might be a 'Minimisation of Drive Test' database. The selection of the mobile communication unit and call or data connection might be done at random. Only when mobile communication devices SU1 and SU2 are actively engaged in collecting 'Minimisation of Drive Test' data, therefore, would they routinely provide location information such as that in signatures 212, 214 and 216. Otherwise, when not engaged in collecting Minimisation of Drive Test data, mobile communication devices SU1 and SU2 might typically provide location information for only one out of every ten-thousand calls that they make.

Database 210 is likely to be lacking in signatures for one or more sub-areas of the cellular wireless communications system.

Figure 3:
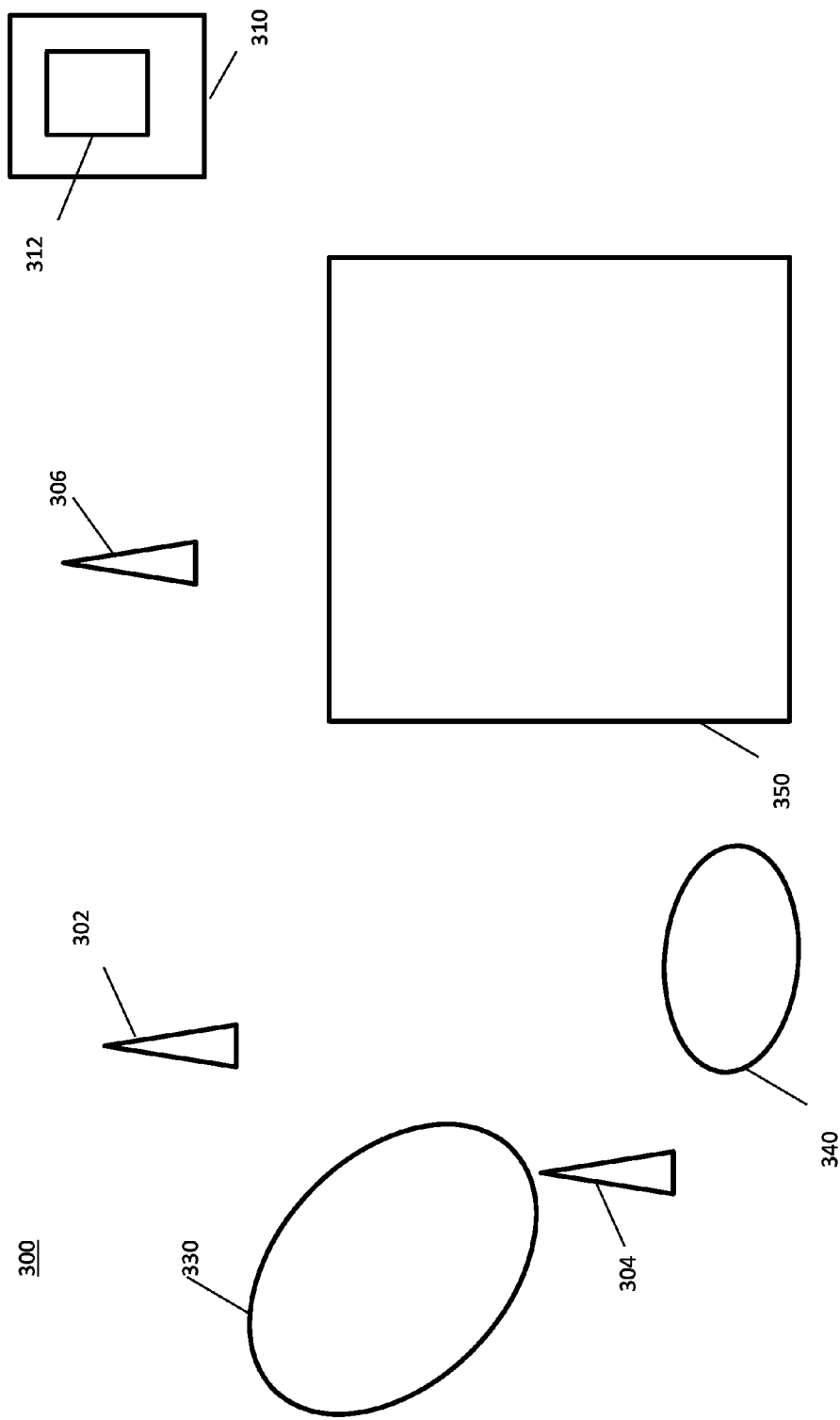
FIG. 3 illustrates a cellular wireless communication system.

FIG. 3 illustrates a cellular wireless communications system 300. Multiple sub-areas of cellular wireless communications system 300 exist for which too few radio frequency measurements are available to a network operator. These sub-areas may be where a density of radio frequency measurements is below a threshold value.

In FIG. 3 illustrates only base stations 302, 304 and 306 of cellular wireless communication system. Controller 310 manages calls within cellular wireless communication system 300. Controller 310 comprises a network element 312, which may be a control processor.

Network element 312 identifies sub-areas of the cellular wireless communication system 300 that have a density of radio frequency measurements below a threshold value. Network element 312 may consider one or more radio frequency measurements, for each part of the cellular wireless communication system 300, when deciding whether or not the density of radio frequency measurements is above or below the threshold value for that part. Examples of measurements dependent on the degree of coverage and quality of service information for each part of the network, or a density of reference signatures such as those in database 210 of FIG. 2. A combination of a density of reference signatures and a density of measurements dependent on the degree of coverage and quality of service information for each part of the network may be considered.

In FIG. 3, first sub-area 330, second sub-area 340 and third sub-area 350 have been identified by network element 312 as having a density of radio frequency measurements that is below a threshold value. First sub-area 330, second sub-area 340 and/or third sub-area 350 may present problems for drive- and walk-testers, because walk-by and/or drive-by mobile communication units are denied access to the sub-area. Alternatively, one or more of the sub-areas may be where a change has been made to coverage provided by the wireless communications system in the sub-area. Alternatively or in addition, one or more of the sub-areas may be where an unacceptably high fault rate has been occurring.

First sub-area 330 and second sub-area 340 might, for example, be areas where the terrain deters subscribers and drive- and walk-testers. Third sub-area 350 might, for example, be an area where access rules prevent drive- and walk-testers gaining access, but where some ordinary subscribers are permitted access, such as a gated community or educational establishment.

Figure 4:
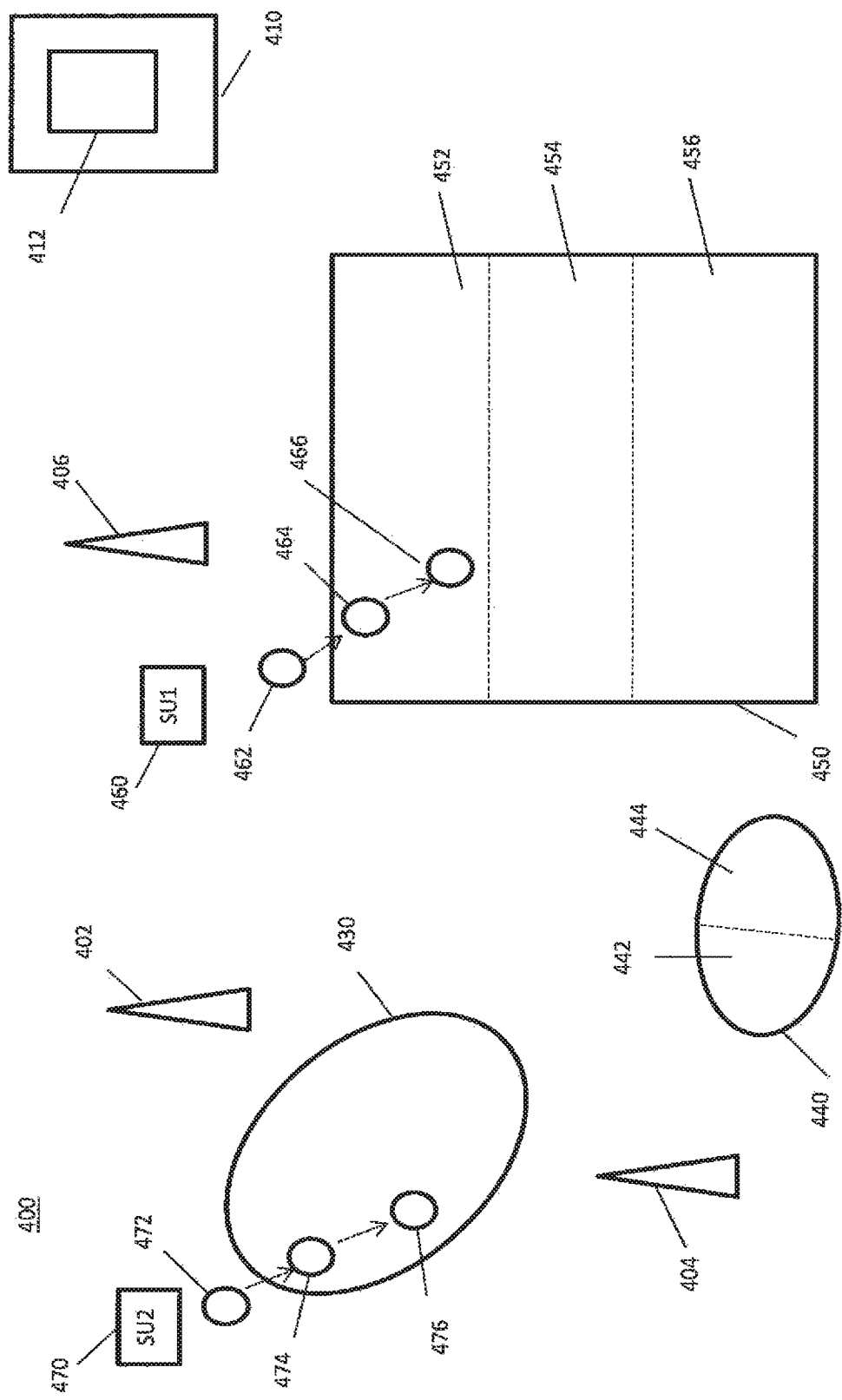
FIG. 4 illustrates a cellular wireless communication system.

FIG. 4 illustrates a cellular wireless communications system 400, which corresponds generally to cellular wireless communications system 300 of FIG. 3. Base stations 402, 404 and 406, controller 410, network element 412, first sub-area 430, second sub-area 440 and third sub-area 450, correspond to the similarly numbered elements in FIG. 3.

Network element 412 has identified first zone 442 and second zone 444 within second area 440. In one exemplary embodiment, network element 412 may have determined that the density of radio frequency measurements in second zone 444 is below a second threshold value, which is lower than the first threshold value. Thus the density of radio frequency measurements in all of second sub-area 440 is below the first threshold value. However, the density of radio frequency measurements in first zone 442 is between the first and second threshold values. Similarly, network element 412 has identified first zone 452, second zone 454 and third zone 456 within third sub-area 450.

Network element 412 provides incentives for the users of one or more subscriber mobile communication units to enter one or more of first sub-area 430, second sub-area 440 and third sub-area 450. An equal incentive may be provided to the users of any subscriber mobile communication unit to enter any of the three areas. However, the incentives may be different for each area. In addition, different users of subscriber mobile communication units may be offered different types and levels of incentive.

Considering the various zones within second sub-area 440 and third sub-area 450, the user of a subscriber mobile communication unit may be influenced to enter at least two of the zones in either sub-area. Network element 412 may provide increased rewards to a user of a subscriber mobile communication unit, in dependence on a number of zones from which the subscriber mobile communication unit provides radio frequency measurements. The rewards for entering each zone may be different, and may be different for one or more users or groups of users. Network element 412 may no longer separately identify at least one zone from the sub-area, when the density of radio frequency measurements for that zone rises above the second threshold. If the density of radio frequency measurements for a zone or any part of a sub-area rises above the first threshold, then the sub-area within which incentives are offered may be correspondingly reduced.

As an illustrative example, first mobile communication unit 460 has been shown. Locations 462, 464 and 466 show successively later locations for first mobile communication unit 460. The user of first mobile communication unit 460 has been influenced to enter third area 450. From third area 450, first mobile communication unit 460 will provide radio frequency measurements at locations 464 and 466. Network element 412 will generate reference signatures and/or location estimates from these radio frequency measurements.

The user of first mobile communication unit 460 would typically have disabled any functionality that provides position measurements, such as GPS functionality, when at location 462 outside third area 450. However, at locations 464 and 466 within third area 450, first mobile communication unit 460 may detect that it has entered into the sub-area, perform a location measurement responsive to detecting that it has entered the sub-area, and transmit the location measurement to the infrastructure element.

Similarly, a second mobile communication unit 470 has been incentivized to more from location 472 outside first sub-area 430 to locations 474 and 476 within first sub-area 430. From first sub-area 430, second mobile communication unit 470 will provide radio frequency measurements at locations 474 and 476.

In the case where a user's mobile communication unit is not equipped with a facility to provide location information itself, such as GPS functionality, or where the mobile communication unit is located indoors and cannot obtain a location 'fix' using the GPS satellites, the network element 412 may be able to provide a suitable location 'fix'. Network element 412 may do this either alone or in conjunction with other similar network elements. One example of an approach that may be employed to providing a geolocation fix in this situation is, for example, use of the techniques described in co-pending U.S. patent application Ser. No. 13/311,132. Reference signatures can therefore be generated by a mobile communication unit that lacks its own positioning measurement system. The user of such a mobile communication unit can still, for example, be incentivised to enter a building for which little or no coverage or service quality information exists, and provide that information. The location of such a mobile communication unit can then be calculated by the network element 412 using functionality within the network, such as, for example, the techniques described in U.S. patent application Ser. No. 13/311,132.

Generating reference signatures from the radio frequency measurements may further comprise creating reference signatures from the following information, each provided by an application on the subscriber mobile communication unit: a location measurement; measured signal quality data; a cell identifier and corresponding observed power level. Generating reference signatures from the radio frequency measurements may further comprise creating reference signatures from at least one of the following types of control information provided by an application on the subscriber mobile communication unit: timing advance; burst throughput rate; dynamic rate control, comprising at least channel quality indicators; signal-to-noise ratio. Generating reference signatures from the radio frequency measurements may further be based on a timestamp received from an application on the subscriber mobile communication unit.

Summarizing FIGS. 2-4, users can be incentivized to obtain measurements to populate a database, for particular sub-areas of a cellular wireless communications system. Users are 'sent' to specific locations by motivating them with a reward, so that their mobile communication unit can provide coverage and quality of service information automatically to the network operator. The information may be sent, for example, via the GEO™ system provided by Arieso™. The reward could be in the form of bonus minutes, free texts, or a reduction in the user's mobile phone bill. It could also be in the form of exclusive content, e.g. music videos, or free downloads, e.g. games. An app on the mobile communication unit may be in the form of a game, such as an adventure game that requires the user to visit specific locations in order to undertake specific tasks. Those tasks may be either virtual or real.

The user of the subscriber mobile communication unit may be influenced to enter the sub-area by the wireless communications system offering at least one of:

content in the sub-area that is not available to the user outside the sub-area; electronic transfer of cash; vouchers for purchases; or reward points that are convertible to goods or services. The user of the subscriber mobile communication unit may be influenced by an entirely virtual reward. The user of the subscriber mobile communication unit may be recognized as being first to reach the sub-area or a zone or point in the sub-area, if no other subscriber mobile communication unit has previously reached that sub-area, zone or point.

The wireless communications system may receive identification information, a timestamp and location information for the subscriber mobile communication unit. Network element 412 may then link the received radio frequency measurements, identification information and location information to a record in the Operation System Support (OSS) database of the wireless communications system. That record comprises other data collected by the wireless communications system at the time of the timestamp, but would not comprise location information until that is added by network element 412 on the basis of radio frequency measurements received as described above.

Figure 5:
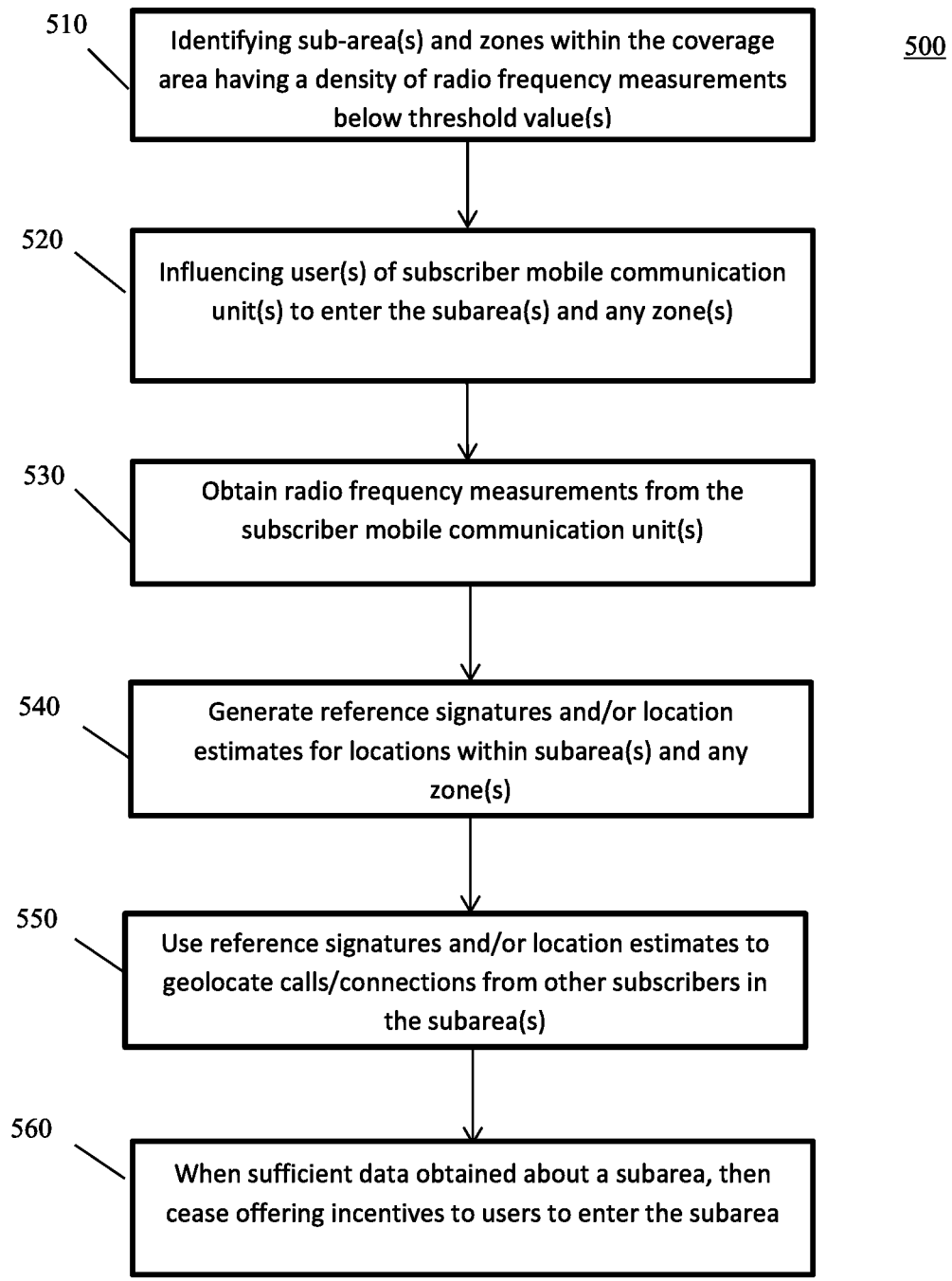
FIG. 5 illustrates a flowchart of a method 500 of some embodiments.

FIG. 5 illustrates a flowchart of a method 500 of some embodiments.

At 510, network element 412 identifies one or more sub-areas, and possibly zones, within the coverage area, which have a density of radio frequency measurements below the first, and possibly also the second, threshold values. At 520, network element 412 influences one or more users of subscriber mobile communication units to enter the sub-areas. Separate incentives for each zone may be provided, where zones within one or more sub-areas have been identified.

At 530, network element 412 obtains radio frequency measurements from the subscriber mobile communication units. At 540, network element 412 may generate reference signatures and/or location estimates for locations within the sub-areas and any zones. This generation may commence as soon as measurements have been received, i.e. whilst other measurements are still being received. At 550, the network element 412 or another part of the mobile wireless communications system may use the reference signatures and/or location estimates to geolocate calls/connections from other subscribers in the sub-areas. Thus the measurements are being put to use, in this example to geolocate calls or connections from other subscriber units in the sub-areas. Those other subscriber units may lack their own functionality for measuring their location, or have disabled that functionality.

At 560, when sufficient data has been obtained about a sub-area, network element 412 then ceases offering incentives to users to enter the sub-area and provide measurements.

Figure 6:
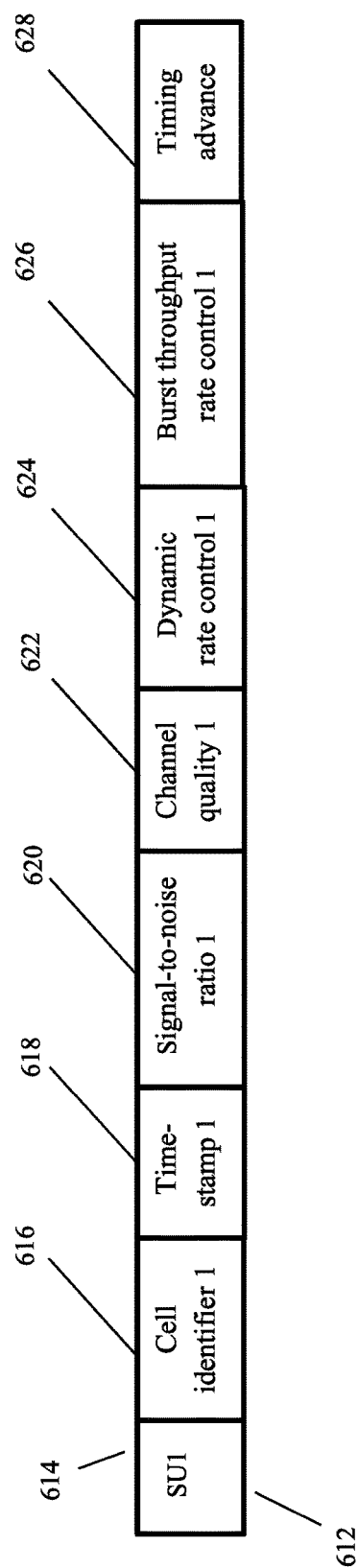
FIG. 6 illustrates an example set of measurements.

FIG. 6 provides an example of a set of measurements that may be provided by an incentivized user within one of first sub-area 430, second sub-area 440 or third sub-area 450 of FIG. 4.

Signature 612, in this example, comprises: An identifier of the mobile communication unit SU1, with reference 614, Cell identifier 616; Timestamp 618; Signal-to-noise ratio 620; Channel quality indicator 622; Dynamic rate control 624; Burst throughput rate control 626; Timing advance 628. Each variable 618-628 in FIG. 6 has been given the reference '1'. This indicates that each of these variables was measured for only a first cell, for which mobile communication unit SU1 has obtained measurements. Mobile communication unit SU1 may provide measurements for each of several cells that it was able to observe at the same time as it obtained the measurements shown in FIG. 6. Signal to noise ratio and channel quality indicator are examples of quantities used in 'dynamic rate control', however the dynamic rate control shown by reference 624 may be based on other parameters than signal to noise ratio and channel quality indicator.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method, comprising:
    identifying a data structure storing reference signatures for use in geolocation of mobile communication units in a cellular wireless communications system, the reference signatures associating location information and radio frequency measurements;
identifying a sub-area, within a coverage area of the cellular wireless communications system, based on the sub-area having a density of reference signatures, stored in the data structure, that is below a threshold value;
influencing movement of a mobile communication unit, of the mobile communication units, to enter the sub-area based on the density of reference signatures for the sub-area being below the threshold value;
obtaining radio frequency measurements from the mobile communication unit in the sub-area; and
generating reference signatures from the radio frequency measurements to be added to the data structure for the sub-area.

2. The method of claim 1, wherein the mobile communication unit provides the radio frequency measurements when the mobile communication unit enters the sub-area based on:
an infrastructure element of the cellular wireless communications system providing details of an extent of the sub-area to the mobile communication unit; and
the mobile communication unit:
detecting that the mobile communication unit has entered into the sub-area;
performing a location measurement responsive to detecting that the mobile communication unit has entered the sub-area; and
transmitting the location measurement to the infrastructure element.

3. The method of claim 1, wherein the mobile communication unit is influenced to enter the sub-area by notification of a reduced tariff for communications from the sub-area.

4. The method of claim 1, wherein the mobile communication unit, in return for providing the radio frequency measurements from the sub-area, is influenced to enter the sub-area by at least one of:
a user of the mobile communication unit being assigned free calls from the sub-area,
the user being provided with a reduction to a bill, or
the user being provided with credit against future calls.

5. The method of claim 1, wherein the mobile communication unit is influenced to enter the sub-area based on interacting with a game, wherein the game requires the mobile communication unit to be located in at least one location within the sub-area.

6. The method of claim 1, wherein the mobile communication unit is influenced to enter the sub-area by providing a user of the mobile communication unit with an incentive that increases with an increasing amount of time spent in the sub-area by the mobile communication unit.

7. The method of claim 1, wherein the mobile communication unit is influenced to enter the sub-area by providing a user of the mobile communication unit with an incentive that increases with increasing amounts of the radio frequency measurements provided from the mobile communication unit while located in the sub-area.

8. A device, comprising:
one or more processors to:
identify a data structure storing reference signatures for use in geolocation of mobile communication units in a cellular wireless communications system,
the reference signatures associating location information and radio frequency measurements;
identify a sub-area, within a coverage area of the cellular wireless communications system, based on the sub-area having a density of reference signatures, stored in the data structure, that is below a threshold value;
influence movement of a mobile communication unit, of the mobile communication units, to enter the sub-area based on the density of reference signatures for the sub-area being below the threshold value,
the mobile communication unit being subscribed to the cellular wireless communications system;
obtain radio frequency measurements from the mobile communication unit in the sub-area; and
generate the reference signatures from the radio frequency measurements to be added to the data structure for the sub-area.

9. The device of claim 8, wherein the sub-area is divided into at least two zones, wherein the mobile communication unit is influenced to enter at least two of the at least two zones.

10. The device of claim 9, where the influence includes providing increased rewards to a user of the mobile communication unit, in dependence on a number of the at least two zones from which the mobile communication unit provides the radio frequency measurements.

11. The device of claim 9, where the one or more processors are further to:
delete at least one zone from the sub-area, when a zone density of the reference signatures for the at least one zone rises above a second threshold.

12. The device of claim 8, wherein the mobile communication unit is influenced to enter the sub-area by the cellular wireless communications system offering at least one of:
content in the sub-area that is not available outside the sub-area;
electronic transfer of cash;
vouchers for purchases; or
reward points that are convertible to goods or services.

13. The device of claim 8, wherein the sub-area is a part of the coverage area of the cellular wireless communications system to which a change has been made to coverage provided by the cellular wireless communications system.

14. The device of claim 8, wherein the sub-area is a part of the coverage area of the cellular wireless communications system having a particular level of fault rates.

15. A non-transitory computer-readable medium storing instructions, the instructions comprising:
a plurality of instructions, that, when executed by a processor of a device, cause the processor to:
identify a data structure storing reference signatures for use in geolocation of mobile communication units in a cellular wireless communications system,
the reference signatures associating location information and radio frequency measurements;
identify a sub-area, within a coverage area of the cellular wireless communications system, based on the sub-area having a density of reference signatures, stored in the data structure, that is below a threshold value;
influence movement of a mobile communication unit, of the mobile communication units, to enter the sub-area based on the density of reference signatures for the sub-area being below the threshold value;
obtain radio frequency measurements from the mobile communication unit in the sub-area; and generate the reference signatures from the radio frequency measurements to be added to the data structure for the sub-area.

16. The non-transitory computer-readable medium of claim 15, wherein the reference signatures are generated from at least one of:
   a location measurement;
   measured signal quality data; or
   a cell identifier and corresponding observed power level;
   wherein each of the location measurement, measured signal quality data, and the cell identifier and corresponding observed power level is provided by an application stored by the mobile communication unit.

17. The non-transitory computer-readable medium of claim 15, wherein the reference signatures are generated from at least one of the following types of control information provided by an application on the mobile communication unit:
   timing advance;
   burst throughput rate;
   dynamic rate control, comprising at least channel quality indicators; or
   signal-to-noise ratio.

18. The non-transitory computer-readable medium of claim 15, wherein the plurality of instructions, when executed by the processor to generate the reference signatures, are to:
   receive a timestamp from an application stored by the mobile communication unit; and
   generate the reference signature based on the timestamp.

19. The non-transitory computer-readable medium of claim 15, wherein the mobile communication unit is influenced by a virtual reward to enter the sub-area.

20. The non-transitory computer-readable medium of claim 19, wherein the virtual reward is provided to a user of the mobile communication unit when the mobile communication unit is recognized as being first to reach the sub-area or a point in the sub-area, if no other mobile communication unit has previously reached the sub-area or point.

21. The non-transitory computer-readable medium of claim 15, wherein the sub-area is a part of the coverage area of the cellular wireless communications system to which a change has been made to coverage provided by the cellular wireless communications system.

* * * * *